United States Patent [19]

Lee

[11] Patent Number: 5,375,259
[45] Date of Patent: Dec. 20, 1994

[54] ANALOG SIGNAL NOISE REDUCTION PROCESS AND APPARATUS

[76] Inventor: Denny L. Y. Lee, 1009 Saber Rd., West Chester, Pa. 19382

[21] Appl. No.: 835,380

[22] Filed: Feb. 20, 1992

[51] Int. Cl.$^5$ .............................................. H04B 7/08
[52] U.S. Cl. .............................. 455/134; 455/277.2; 455/296
[58] Field of Search .............. 455/135, 133, 134, 137, 455/273, 277.2, 278.1, 272, 296, 295, 132, 277.1, 303, 280, 226.1, 226.2, 226.3

[56] References Cited

U.S. PATENT DOCUMENTS

| | | | |
|---|---|---|---|
| 2,515,668 | 7/1950 | Schock et al. | 455/134 |
| 4,246,655 | 1/1981 | Parker | 455/135 |
| 4,370,522 | 1/1983 | Takeda et al. | 179/1 GD |
| 4,416,024 | 11/1983 | Ugari et al. | 455/303 |
| 4,710,945 | 12/1987 | Bocci et al. | 455/135 |
| 4,736,460 | 4/1988 | Rilling | 455/283 |
| 4,752,955 | 6/1988 | Torick | 381/13 |
| 4,881,274 | 11/1989 | Tazaki et al. | 455/296 |
| 4,910,799 | 3/1990 | Takayama | 455/296 |

FOREIGN PATENT DOCUMENTS 3265224 11/1991 Japan .................. 455/133

OTHER PUBLICATIONS

FMX Mobile Reception by T. E. Rucktenwald, & Emil L. Torick, 1988 IEEE Transactions on Consumer Electronics.

FMX Decoder Development by T. Ishikawa & M. Tanno IEEE Transactions on Consumer Electronics, Aug. 1987.

TEA6101/TEA6101T Antenna Diversity Circuit, by Philips Semiconductors publ. date unknown.

Primary Examiner—Reinhard J. Eisenzopf
Assistant Examiner—Nguyen Vo
Attorney, Agent, or Firm—Breneman, Georges & Krikelis

[57] ABSTRACT

Process and apparatus for reduced noise reception of frequency modulated electromagnetic signal transmissions employing at least three spatially displaced receiving channels. The received at least three signals are continuously sampled at a high frequency, and the sampled signals are compared to each other. As a result of this comparison one sampled signal is selected and used for the reconstruction of the original transmission. The process is repeated for each sampling.

16 Claims, 8 Drawing Sheets

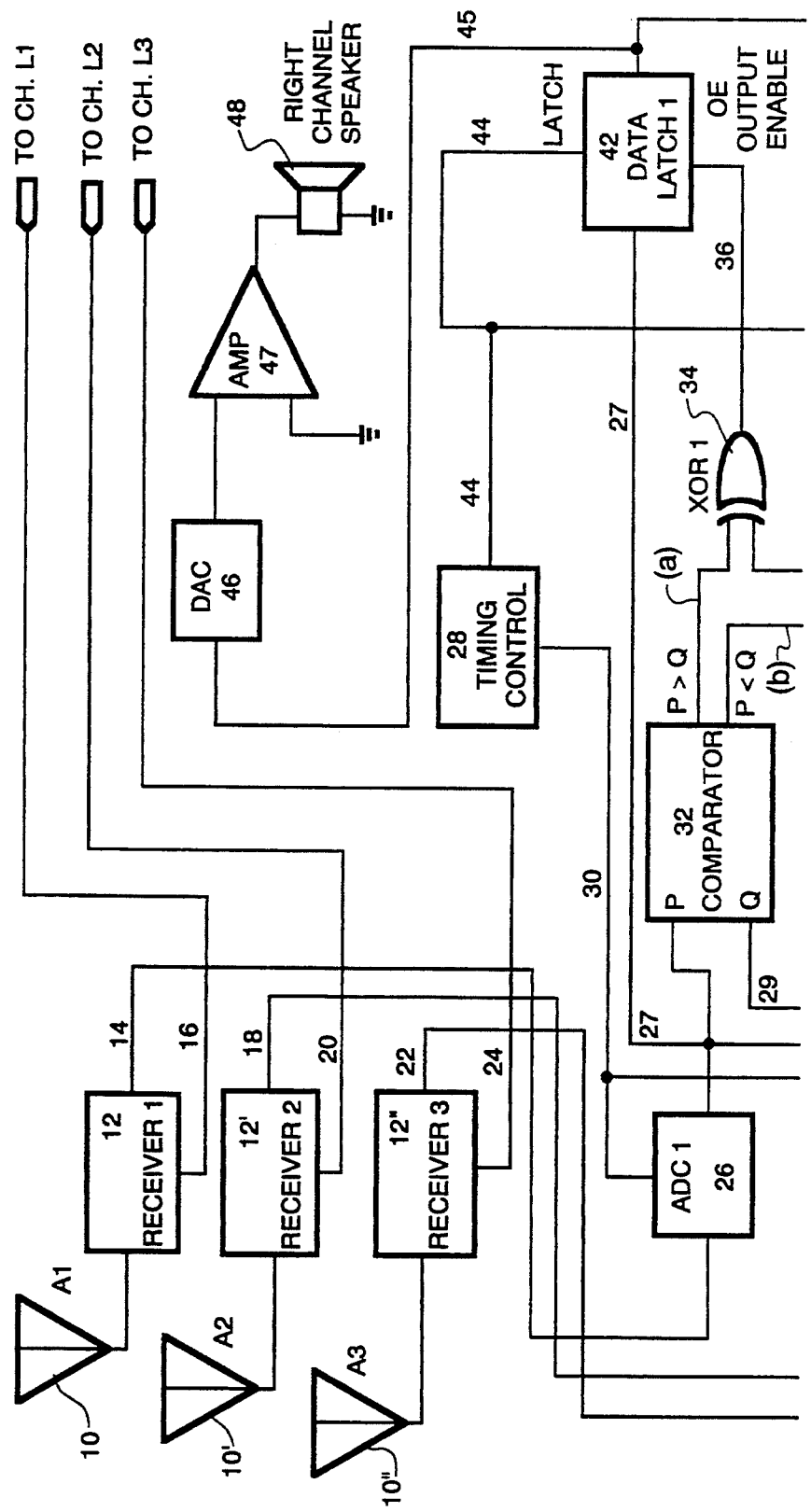

TABLE I

| CONDITION | A>=B | A<B | B>=C | B<C | C>A | C<=A | INPUT TO GATE XOR-A (a,f) | INPUT TO GATE XOR-B (b,c) | INPUT TO GATE XOR-C (d,e) | OUTPUT FROM GATE XOR-A | OUTPUT FROM GATE XOR-B | OUTPUT FROM GATE XOR-C | CHANNEL SELECTED |
|---|---|---|---|---|---|---|---|---|---|---|---|---|---|
| | (a) | (b) | (c) | (d) | (e) | (f) | | | | | | | |
| A=B=C | 1 | 0 | 1 | 0 | 0 | 1 | 1,1 | 0,1 | 0,0 | 0 | 1 | 0 | B |
| A=B>C | 1 | 0 | 1 | 0 | 0 | 1 | 1,1 | 0,1 | 0,0 | 0 | 1 | 0 | B |
| B=A<C | 1 | 0 | 0 | 1 | 1 | 0 | 1,0 | 0,0 | 1,1 | 1 | 0 | 0 | A |
| B=C>A | 0 | 1 | 1 | 0 | 1 | 0 | 0,0 | 1,1 | 0,1 | 0 | 0 | 1 | C |
| C=B<A | 1 | 0 | 1 | 0 | 0 | 1 | 1,1 | 0,1 | 0,0 | 0 | 1 | 0 | B |
| A=C>B | 1 | 0 | 0 | 1 | 0 | 1 | 1,1 | 1,0 | 1,0 | 0 | 1 | 1 | C |
| C=A<B | 0 | 1 | 0 | 1 | 1 | 0 | 0,1 | 1,1 | 0,0 | 1 | 0 | 0 | A |
| A>B>C | 1 | 0 | 1 | 0 | 0 | 1 | 1,1 | 0,1 | 0,0 | 0 | 1 | 0 | B |
| C>B>A | 0 | 1 | 0 | 1 | 1 | 0 | 0,0 | 1,0 | 1,1 | 0 | 1 | 0 | B |
| A>C>B | 1 | 0 | 0 | 1 | 0 | 1 | 1,1 | 1,0 | 1,0 | 0 | 0 | 1 | C |
| B>C>A | 0 | 1 | 1 | 0 | 1 | 0 | 0,0 | 1,1 | 0,1 | 0 | 0 | 1 | C |
| B>A>C | 0 | 1 | 1 | 0 | 0 | 1 | 0,1 | 1,1 | 0,0 | 1 | 0 | 0 | A |
| C>A>B | 1 | 0 | 0 | 1 | 1 | 0 | 1,0 | 0,0 | 1,1 | 1 | 0 | 0 | A |

Fig. 2

ANALOG SIGNAL NOISE REDUCTION PROCESS AND APPARATUS

BACKGROUND OF THE INVENTION

1. Field of the Invention

This invention relates to a method of analog signal processing and, more particularly, to an improved method of separating noise from information in a signal.

2. Description of Prior Art

When information is communicated through the process of transmission and reception, the received information signal contains in addition to the original information portion an unwanted signal portion due to noise, which degrades the original signal. When the noise falls within the spectrum or bandwidth of the information signal, it is often difficult to distinguish noise from signal.

This noise problem is particularly vexing in FM reception in moving vehicles. In the case of FM transmission, FM modulated radio waves carrying a non-repetitive signal of voice or music are transmitted from a fixed location. The radio waves arrive to a receiving location both via a direct path and via many different reflected paths. Since a receiving antenna output is an electric field which is the composite of the electric fields generated by the radio waves arriving both directly and after reflection, radio waves from different paths, produce constructive and destructive interference resulting in what is commonly referred to as "multipath" noise. In the case of a fixed receiver, a directional antenna can be used to favor reception of a radio signal from a preferred path and to reject signals from other paths; alternatively, the antenna may be moved to a near by location where signals from different paths are combining favorably.

In the case of a mobile receiver, however, the antenna is constantly moving in and out of areas with constructive and destructive interference. This fluctuation of electric field strength degrades the reception and distorts the information carried. If the received information is in the audio range the resulting sound is very offensive to the ear.

Similarly, even in the case where the antenna is in a fixed location, and the location has been selected to be a low noise location, changing multipath induced noise often interrupts the normal noise free reception due to the temporary introduction of a reflective surface, such as low flying airplanes, passing trucks, trains or the like.

In an effort to reduce noise in signals, it has been proposed to use "Auto-correlation" and "Cross-correlation" techniques for noise removal if either the signal or the noise is repetitive. However since most signals do not contain repetitive information this approach is of rather limited practical utility.

An alternate approach proposes to use signal averaging to reduce the signal to ratio noise. However, the enhancement of signal to noise ratio using signal averaging is only proportional to the square root of the number of independent channels that contain the same signal information and tends to increase "signal glitch" as each of the receiving antennas passes through an area of depressed signal.

There is still need for an effective way to reduce noise in analog information in a simple and inexpensive manner especially when the information is not of a repetitive or predictable nature.

SUMMARY OF THE INVENTION

It is an object of this invention to provide a method for receiving an analog information signal comprising amplitude and frequency components the method comprising:

(1) receiving the information carrying signal, over "n" discrete channels, wherein "n" is an integral greater than 3;

(2) comparing the amplitude of the information received over said "n" channels and:

(a) outputing any one of any two or more signals having substantially the same received signal amplitudes, or (b) if no two or more signals have substantially the same amplitudes, outputing a signal having an amplitude equal to a preselected one amplitude of any two sampled signals having a least difference in amplitudes from all other sampled signals;

(3) repeating step (2) at a frequency exceeding a highest frequency component in the information signal.

The preselected amplitude is preferably the higher one of the amplitudes of the two signals having the least difference between their amplitudes.

Prior to the comparing step a sampling step may be employed to sample each of said received signals, to provide "n" sampled signals each of said sampled signals having a sampled amplitude corresponding to a combined amplitude of the information signal amplitude and the noise amplitude in the sample;

It is also an object of this invention to provide a method for reducing noise in information received in a receiver, wherein each of the received signals is sampled simultaneously to provide "n" sampled signals.

It is also within the scope of the present invention to provide a method for reducing noise in information received in a receiver comprising:

(1) receiving simultaneously over 3 separate channels, a signal comprising analog information signal portions and noise portions, the information and noise having frequency and amplitude components, each channel receiving the same information signal;

(2) sampling each of said received signals, to provide 3 sampled signals each of said sampled signals having a sampled amplitude corresponding to a combined amplitude of the information signal amplitude and the noise amplitude in the sample;

(3) comparing the sampled amplitudes of each of said sampled signals, and:

(a) if two or more of said sampled signals have the same amplitude, selecting any one of said two same amplitude sampled signals, or (b) if no sampled signals have the same amplitude, selecting the sampled signal having a middle amplitude;

(4) repeating steps (2) and (3) with a sampling frequency exceeding a frequency representing a highest frequency component of the information signal; and (5) combining the selected sampled signal for each sampling to reconstruct a new, reduced noise, information signal.

Still within the present scope is a method for reducing noise in information received in a receiver over three independent channels as hereinabove described wherein the sampling of the received signals occurs substantially simultaneously Further within the scope of this invention is apparatus for receiving an analog information signal comprising amplitude and frequency components the apparatus comprising:

"n" discrete receiving channels for receiving the information carrying signal, wherein "n" is an integral greater than 3;

logic means connected to said receiving means for comparing the amplitude of said "n" received signals and for:

(a) outputing any one of any two or more signals having substantially the same received signal amplitudes, or (b) if no two or more signals have substantially the same amplitudes, outputting a signal having an amplitude equal to a preselected one amplitude of any two sampled signals having a least difference in amplitudes from all other sampled signals.

In a preferred embodiment, the preselected one amplitude is the higher of the two amplitudes of the signals having the least difference in their amplitudes.

The apparatus may further include sampling means connected to the receiving means for simultaneously sampling said received signal in said "n" channels to generate "n" sampled signals prior to applying the signals to the logic means.

The apparatus may also be adapted to receive the analog information signal over at least three discrete receiving channels for receiving the information carrying signal, in which case the logic means compare the amplitude of the three received signals and:

(a) when two or more of said signals have substantially equal amplitudes, output any one of said two or more substantially equal amplitudes;

(b) when no two or more signals have substantially the same amplitude, output an amplitude of one of said sampled signals whose amplitude is intermediate of the other two sampled signal amplitudes.

The apparatus may also comprise sampling means for simultaneously and continuously sampling said three received information signals to continuously produce at least three simultaneous sampled information signals each of said sampled signals having an amplitude and in this instance, the logic means are connected to said sampling means.

BRIEF DESCRIPTION OF THE DRAWINGS:

FIG. 2 is a truth table used in the apparatus of FIG. 1 to select which of the three input signal amplitudes will be used for each signal sampling.

Figure 1B:
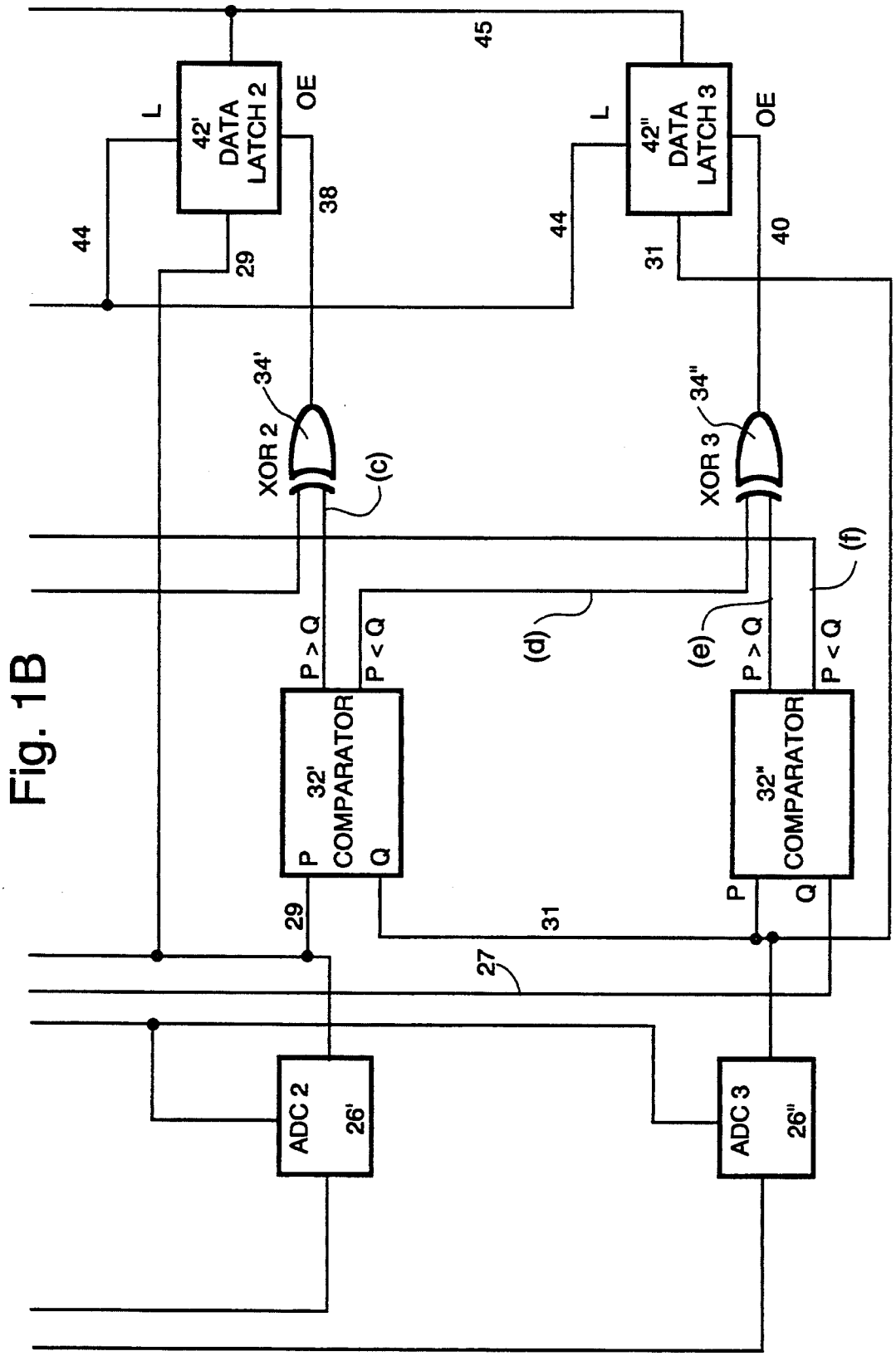
FIG. 1 is a schematic diagram of digital apparatus for the practice of this invention using three input channels.

DETAILED DESCRIPTION OF THE INVENTION:

The present invention is based on the following logic. When a analog signal is transmitted or received by a single channel, contaminated by noise in the same signal bandwidth, the noise is usually indistinguishable from the signal. If the signal is received from two distinct channels, with each channel containing its own noise component, it is still difficult to determine which channel is least contaminated by noise at any given moment. However, if the signal is received from three or more channels, each of which are not simultaneously carrying the same noise, there is a logical way of identifying the noise component.

Consider for example a system comprising three independent receiving channels, Ch. A, B, and C. At a given moment, a noise burst is affecting one of the channels, say Ch. A. At this moment, the signal amplitude received through channel A will be different from that received from either channels B or C. Depending on the phase of the noise, the amplitude of the signal from A may either be higher or lower than that of B or C while the amplitudes of B and C are equal or nearly equal to one another. By comparing amplitude A, B, and C, the noise contaminated channel, Ch. A, can be identified. Uncontaminated signal can be extracted at this moment from one of the channels with equal amplitudes, Ch. B or Ch. C. Following this reasoning, at any given moment, the channels with equal amplitude are most likely to be uncontaminated.

When all three channels are affected by different noise simultaneously, without additional information related to the signal or the noise, the channel with the middle amplitude can be shown to have the best chance of containing the best information.

It is therefore possible to rapidly compare the signals from all three channels and continuously select the signal with the least noise, i.e. the middle amplitude level signal or the equal amplitude signal as the case may be. A new signal can be thus be reconstructed which signal will have quality better than A, B, or C and will be least contaminated with noise. A electronic circuit can be built to sample the signal from each channel with a sampling rate preferably two times or more higher than highest signal frequency. For example, a sampling rate higher than 40 khz will be sufficient for sampling audio information.

When more than three channels are available for signal reception, the signals amplitudes are again periodically compared to each other by periodic repetitive sampling. If two or more signals have the same magnitude, then any one of those will be selected. The difficulty here lies in cases where no two signals have the same, or substantially the same amplitude, but there is a spread of signal magnitudes. In this case the amplitudes are again compared and the two signals having amplitudes differing by the smallest amount are first selected, then the signal having the highest of the two amplitudes is selected as the "middle" amplitude signal of the lot.

Referring now to the drawings and more particularly to FIG. 1, there is shown an apparatus for the implementation of the herein above described process for the reception of an FM modulated signal, using three input channels. Such arrangement is particularly advantageous in the case where the receiver is mounted on a moving platform such as an automobile.

The apparatus comprises three receiving antennas, 10, 10', and 10" which are physically spaced from each other. The antennas are respectively connected to three signal receivers 12, 12', and 12". The receivers output a demodulated analog information signal having an amplitude and a frequency component and comprising both noise and information portions.

Each of the three receivers output is connected over lines 14, 18, and 22 to three Analog to Digital converters (ADC) 26, 26' and 26" respectively.

A timing control module 28 over line 30 controls the sampling rate of the ADCs at a frequency which is higher than the highest audio frequency component in the analog information signal and preferably at a frequency which is twice the highest audio frequency in the information signal. In the FM receiver case, the sampling rate would typically be of the order of 40 Khz or more.

The outputs of the ADCs 26, 26' and 26" are connected over lines 27, 29, and 31 respectively to three comparators 32, 32', and 32". Specifically, comparator 32 receives the output of ADC 26 and 26', comparator 32' receives the output of ADC 26' and 26" and comparator 32" receives the output of ADC 26 and 26". Each comparator has two inputs P and Q and two outputs whose status depends on the comparative magnitude of the signals at the inputs. Comparator 32 output (a) occurs when the input in P(32) is equal or greater than the input in Q(32) and output (b) occurs if P(32) is less than Q(32). Similarly, (c) occurs if input P(32') on comparator 32' exceeds or is equal to the input in Q(32') while (d) occurs if P(32') is less than Q(32'). Finally output (e) of comparator 32" occurs if P(32") exceeds Q(32") input, and (f) occurs if Q(32") is equal to or less than P(32").

The outputs of comparator 32 are connected to exclusive "OR" (XOR) gates 34 and 34' respectively. Similarly, the outputs of comparator 32' are connected to XOR gates 34' and 34" and the outputs of comparator 32" are connected to XOR gates 34 and 34".

The XOR gates output their signal over lines 36, 38, and 40 to latching modules 42, 42' and 42". These data latching modules are each connected to the output of one each of the ADCs and hold a signal representative of the signal amplitude outputed by the ADCs 26, 26' and 26". The latching modules are controlled both by the XOR gates and the timing control 28. The XOR gates control the output of the latching modules enabling an output to appear over line 45 depending on the status of the XOR gate output. The timing circuit resets the latching modules with every sampling pulse, to obtain a new set of values.

The latching modules are all connected in parallel at their output over line 45 to a digital to analog converter, (DAC) 46. The output of the DAC 46 is directed to an amplifier and therefrom to a speaker.

For stereo reception, the circuit shown in FIG. 1 is duplicated and each of the right and left audio channels handled independently. In FIG. 1 the connection for the other channel is over lines 16, 20 and 24.

In operation, the three antennas produce three information signals for the right channel at the output of receivers 12, 12' and 12", signals A, B, and C respectively. Timing control 28 continuously samples the output of the receivers as it is applied to the digital converters 26, 26' and 26" and produces for each timing pulse a digital output indicative of the signal amplitude at that moment. Thus on lines 27, 29, and 31 there appear signals A1, B1, C1 which are digital amplitude signals. Those signals are also applied to and stored in the latching modules 42, 42' and 42".

The signals are applied to the inputs of the comparators 32, 32', and 32" as shown in FIG. 1. Depending on whether the input in gate P is equal to or higher than the input in gate Q or lower than the input in gate Q there is a "high" or "low" signal indication at the output of each comparator which is applied to the XOR gates 34, 34' and 34". Table 1 shown in FIG. 2, summarizes the various logic states resulting from the various possibilities of signal A, B, and C amplitudes. As can be observed from the XOR gates output for all three gates, there is only one enabling signal appearing regardless of the particular signal amplitude of signals A, B, and C. Thus a shown in column "N" at any time there is only one of the latching modules enabled producing an output which corresponds to one of the amplitudes of signals A1, B1, or C1. This signal is applied to DAC 46 and recombined to reconstruct a continuous analog signal as a composite of the sum of the signals continuously appearing on line 45 as a result of the continuous sampling of the input signals A, B, and C. The recombined low noise information signal that is used in an amplifier to drive a speaker.

Figure 3:
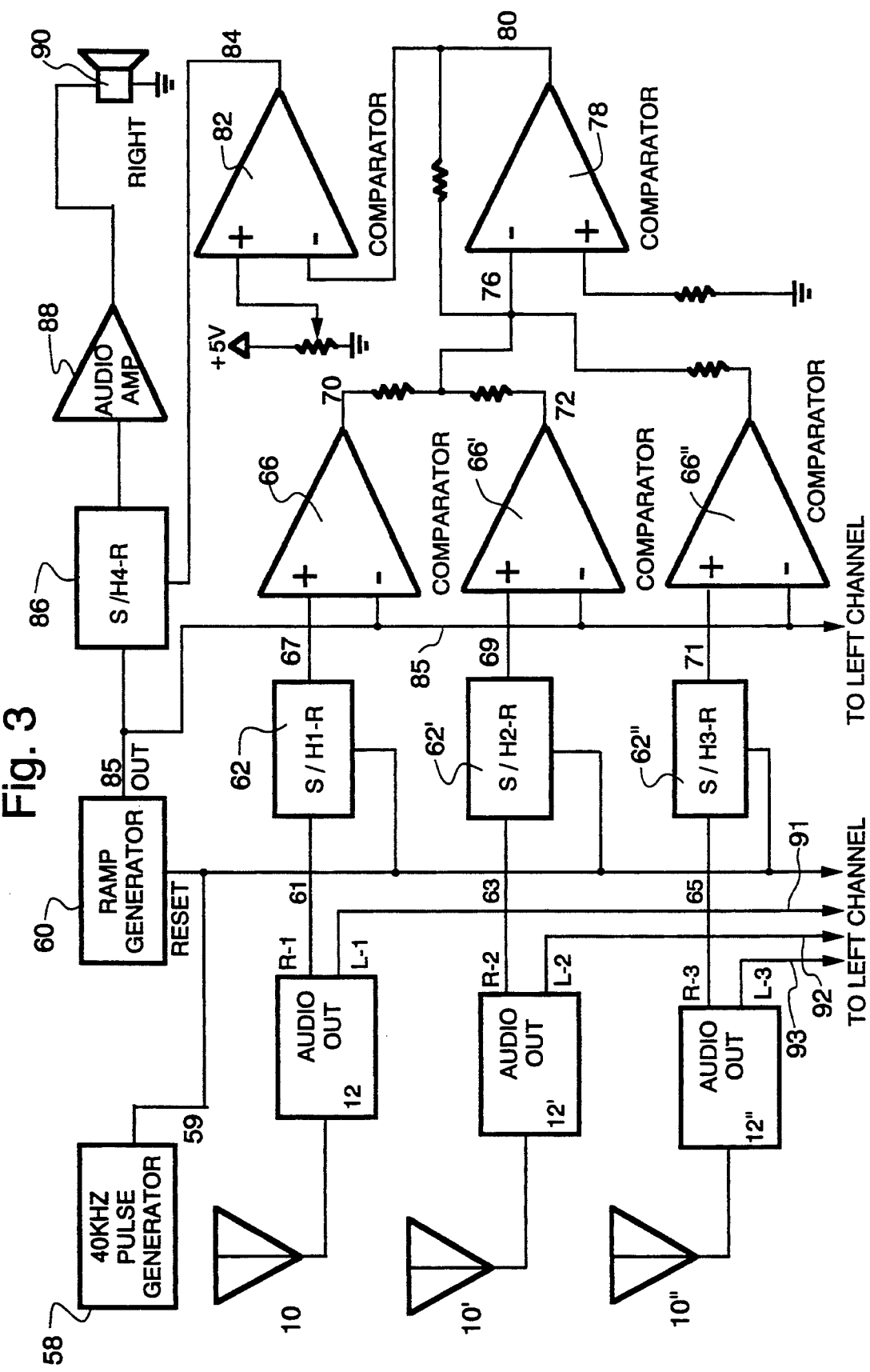
FIG. 3 is a schematic diagram of an analog circuit for the practice of the present invention using three input channels.

FIG. 3 shows an alternate implementation of the same invention, wherein the signal selection logic process is accomplished in analog rather than digital circuitry. Input is again derived from three antennas, 10, 10' and 10" in combination with three receivers 12, 12' and 12". For stereo FM receiver applications there will be two outputs from each receiver one for the left and one for the right audio channels, whoever, for simplicity, only one audio channel is illustrated since both audio channels are identical.

The output of the receivers 12, 12', and 12" is connected over lines 61, 63, and 65 to sample and hold modules 62, 62' and 62". A pulse generator 58 operating at a frequency higher than the highest frequency component of the information signal, and preferably at twice the frequency of the highest frequency component desired to be preserved in the information signal is connected to both a ramp generator 60 and to the three sample and hold modules 66, 66', and 66". The pulse generator output is used to reset the ramp generator and the sample and hold modules.

The output of the ramp generator is connected over line 85 to a fourth sample and hold module 86, and to one of two inputs of each of three comparator modules 66, 66', and 66". The other of the two of each comparator inputs is connected to the output of each of the sample and hold modules 62, 62', and 62" respectively, over lines 67, 69, and 71.

The output of the comparator modules is either a "0" voltage or a preset voltage, i.e. the operation is that of a bistable device, having either 0 or a fixed value output depending on whether the input from the sample and hold module exceeds the input from the ramp generator. All three comparators preferably output substantially the same fixed voltage.

The comparator output is connected to an adder amplifier 78, whose output in turn is applied over line 80 to one of two inputs of a fourth comparator 82. The other of the two inputs of comparator 82 is connected to a power source to provide a preselected comparison voltage preferably set at a value just below the value outputed by the adder 78 when two of the comparators 66, 66' or 66" have triggered and each produced the preselected output.

Comparator 82 output is connected to sample and hold module 86 and serves to gate the signal from sample and hold module 86 to audio amplifier 88. The amplifier output is used to drive an output device such as a speaker.

As earlier suggested, in applications involving stereo reception, the output of the second audio channel will be directed over lines 91, 92, and 93 to circuitry duplicating the circuitry comprising the sample and hold modules 62, 62', and 62", and associated comparators, adders etc. The outputs of the pulse generator 58 and ramp generator 60 can be used in both channels.

The operation of the analog apparatus is best explained with reference to the timing diagram appearing in FIG. 4 in which curve "I" represents the timing pulse from pulse generator 58, curve "II" represents the output of the ramp generator 60 and curve "III" shows the output of adder amplifier 78. The vertical axis represents signal amplitude and the horizontal axis represents elapsed time.

As previously described, the three receivers 12, 12' and 12" output three demodulated analog signals containing an information portion and a noise portion, having amplitude and frequency components. At a time "0" which for illustration purposes coincides with the start of a pulse output from the pulse generator 58, the ramp generator is reset to "0" and begins generating an ever increasing voltage output. At the same time the sample and hold modules 62, 62', and 62" sample the signal input from the receivers and hold the instantaneous voltage representing the input signal amplitude. This voltage is next applied to one of the comparator 66, 66", and 66" inputs so that each of the three comparators sees at one of its inputs a voltage representing the held amplitude of the input signal.

The second comparator input of each of the three comparators 66, 66' and 66" is connected to the output of the ramp generator over line 85. The comparator arrangement is such that as long as the ramp signal is less than the signal from the sample and hold module the comparator output is "0". When the ramp output exceeds the sample and hold output voltage, the comparator outputs a constant preselected voltage. Such voltage is preferably the same for each comparator output.

Figure 4:
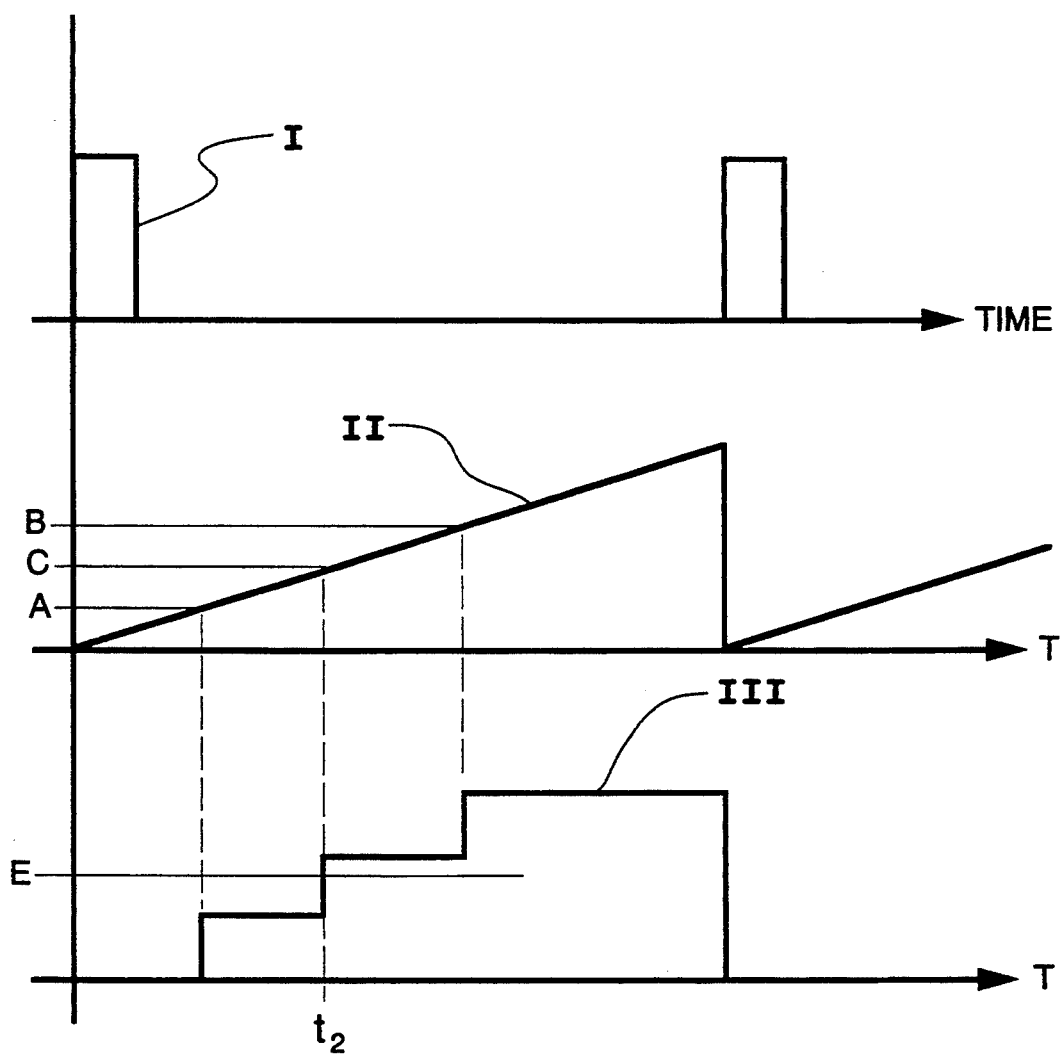
FIG. 4 is a timing diagram related to the operation of the circuit shown in FIG. 3.

As seen from curve II in FIG. 4, assuming that the three signals are "A", "B", and "C", and that B>C>A each of the three comparators will switch to produce an output as the ramp voltage exceeds the signal voltage.

The output of the comparators is applied to the input of the adder amplifier 78. As each of the comparators switches and outputs a signal, the adder produces a composite of the inputs which typically appears as in curve "III". The adder output is next applied to comparator 82 which is set through a bias voltage "E" to produce an output voltage only when the adder output exceeds "E".

By selecting "E" such that it is just less than the combined output of two of the comparators 66, 66', or 66", comparator 82 will produce an output whenever a middle signal amplitude is detected. The time "t" of the switching occurs at the same time as when the amplitude of the ramp generator is the same as the magnitude of the detected information signal for that middle channel. Therefore, the output of comparator 82 is next used to activate the sample and hold module 86 which preserves the value of the ramp voltage at that instant and applies it to the amplifier 88 and therefrom to a speaker or other output device. The process repeats with the next pulse from the pulse generator and so on, always selecting the middle channel for the reconstruction of the information signal at the input of amplifier 88.

It is easily observed that if two or more signals are the same in amplitude, the switching time will be the same, but the adder output will be double and the voltage at the input of comparator 82 will exceed "E" thus producing the desired result.

When more than three independent input channels of information are available, i.e. when "n" is greater than 3, the invention may be implemented in either digital form, through dedicated hardware of the type shown in FIG. 1 properly adapted for more than 3 inputs, or through the use of a programed CPU to perform the necessary logical operations. These operations comprise sampling, holding, and testing the sampled signals' amplitudes to determine if two or more have the same or substantially the same value, and if so outputting a held amplitude; if no two amplitudes are the same or substantially so, the logic process after testing the held amplitudes determines which two are the closest in magnitude and then selects a predetermined one of the two which in the preferred embodiment is the highest of those two as an output; and repeating continuously this operation to generate a continuous output signal.

Figures 5, 5A, 5B:
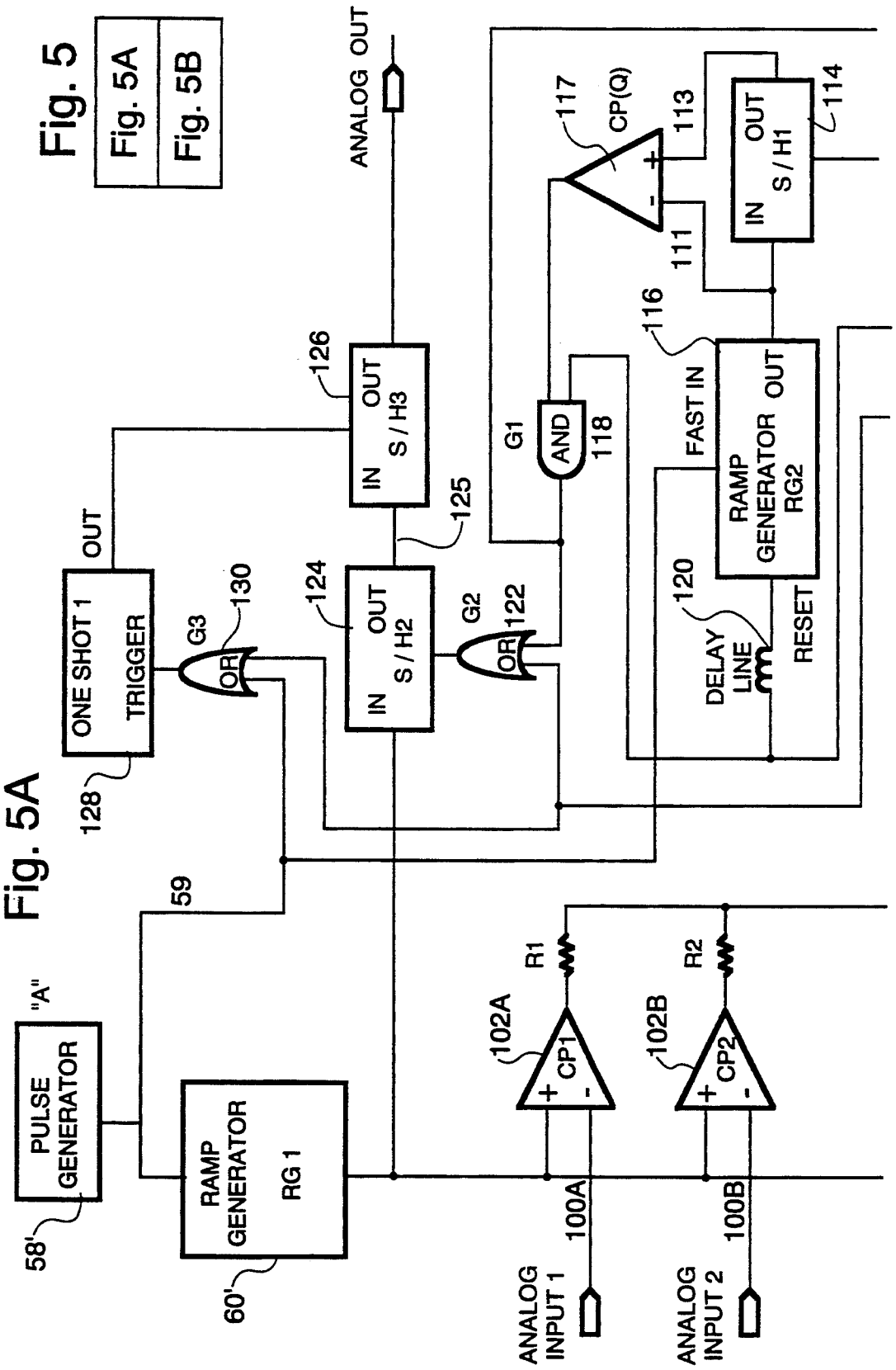
FIG. 5 is a schematic diagram of an analog circuit for implementing this invention using "n" input channels.
Figure 5B:
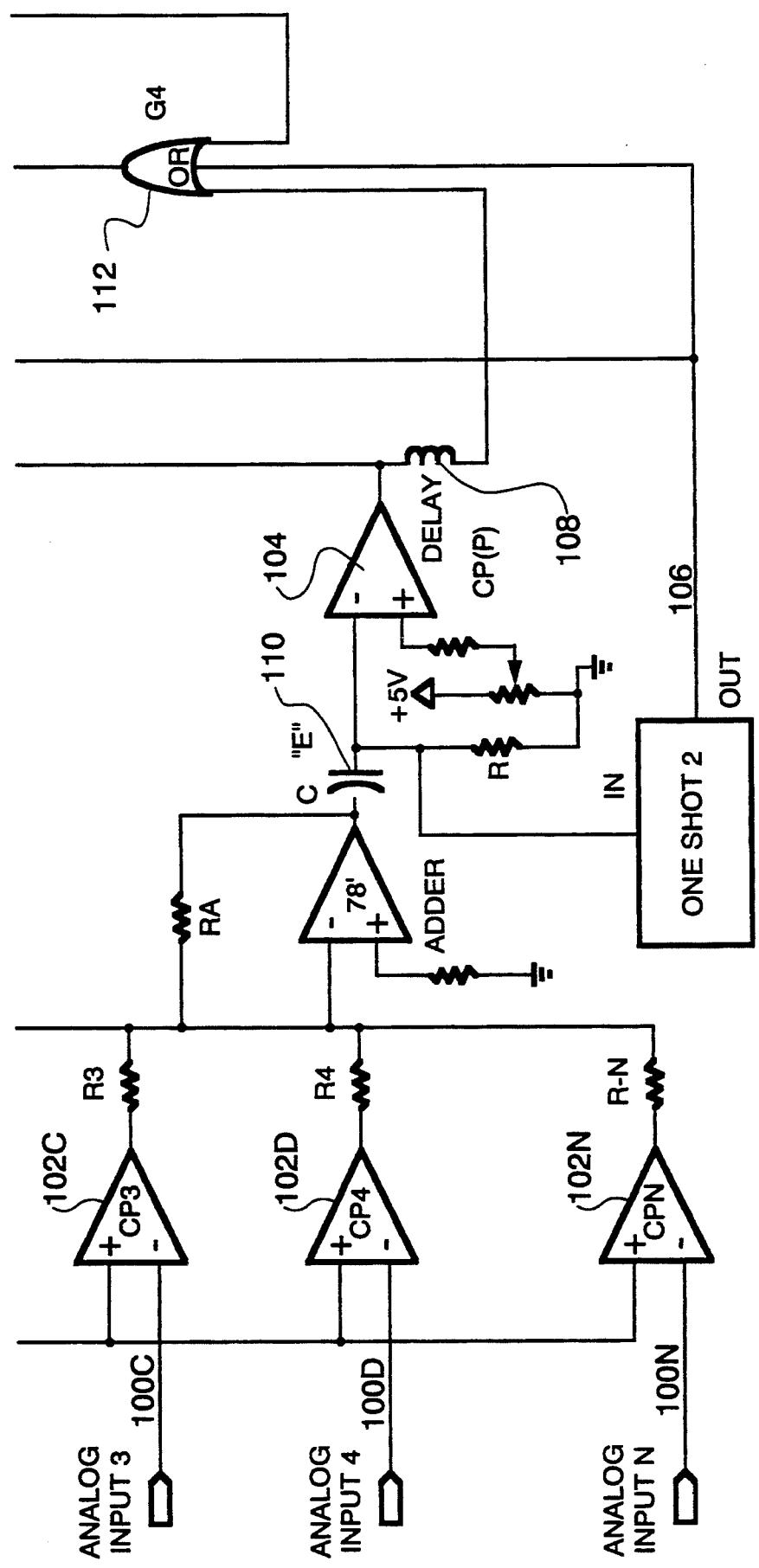

Handling more than three signals according to this invention in analog circuitry is also possible through the use of a circuit such as shown in FIG. 5.

A plurality of "n" (n>3) demodulated information signals received through an array of antennas and receivers substantially as shown in FIG. 3 and omitted from FIG. 4 to avoid overcomplicating the circuit, is supplied to a plurality of comparators 102A, 102B, 102C, 102D, ... 102n, over input lines 100A, 100B, ... 100n. Each signal is applied to one of the two inputs of the comparators. The other input of all comparators 100A, ... 100n are connected in parallel to the output of a first ramp generator 60; a pulse generator 58 operating at a frequency higher than the highest frequency in the information signal is again used to reset the first ramp generator.

The pulse generator is also connected to one of two inputs of an OR gate 130 and to a second ramp generator 116 over line 59. Ramp generator 116 has two rising voltage rates, a "fast" and a "normal" one. The pulse generator 58 accesses the fast rate.

The output of comparators 100A, ... 100n are connected in parallel to an adder module 78. This adder module output is connected to a differentiation circuit 110 comprising a capacitor and a resistor. The output of the differentiation circuit is applied to comparator 104 and to one shot multivibrator circuit 106. The one shot 106 output is connected to one of three inputs of an OR gate 112. The other two gate 112 inputs comprise the output of comparator 104 after going through a delay circuit 108, and of an AND gate 118.

The output of comparator 104 is also connected to one of two inputs of OR gates 122, and 130, and through a delay line 120 to the second ramp generator 116. OR gate's 122 other input is connected to the output of AND gate 118. AND gate 118 has two inputs the second input being connected to the output of comparator 117. Inputs to the comparator 117 are provided over lines 111 and 113 from a sample and hold module 114 and ramp generator 116. Ramp generator 116 is also connected to sample and hold circuit 114, which in turn is controlled by the output of OR gate 112.

Figure 6:
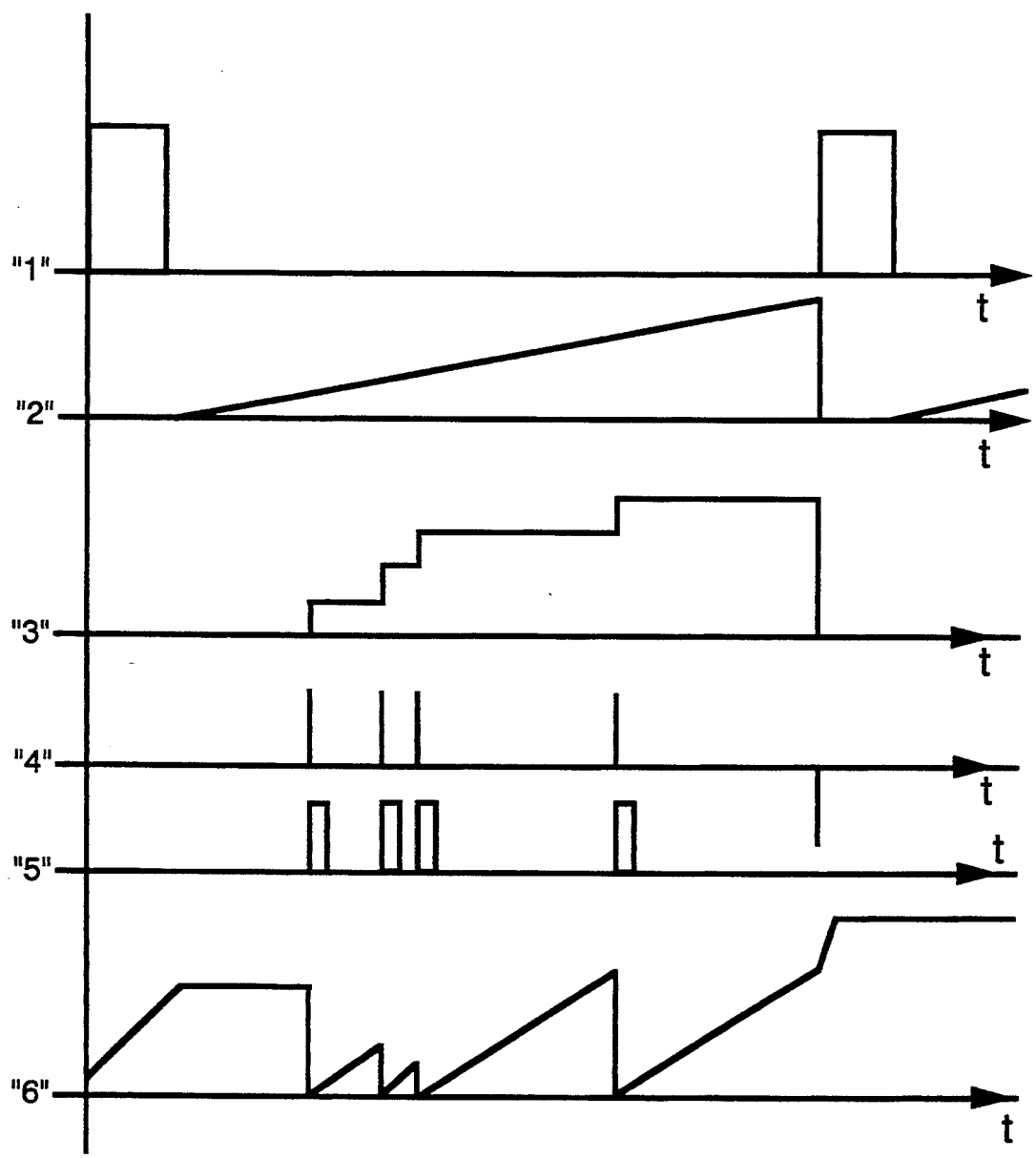
FIG. 6 is a timing diagram related to the operation of the circuit depicted in FIG. 5.

The operation of this circuit is best understood with reference to FIG. 6 in which there are shown 6 curves representing signal amplitude at different parts of the circuit as a function of elapsed time.

Curve 1 shows the output of the pulse generator which establishes the repetition or sampling rate, and resets the ramp generator 60 as shown in curve 2. The signals received through receivers not shown in FIG. 5 and applied over lines 100A . . . 100n to comparators 102A . . . 102n produce an output as the ramp generator amplitude exceeds each signal's amplitude. The output of each comparator 102 is either 0 or a fixed magnitude which is the same for all comparators. In a similar manner as described earlier, a staircase type signal output curve 3 appears at the output of adder 78 as a result of the combined output of the plurality of signal amplitudes appearing at the comparators' inputs.

This adder signal is now differentiated in differentiation circuit 110 to provide a series of spikes shown in curve 4, indicating the transition from each level. The amplitude of these spikes will vary by multiple equal increments depending on whether the staircase signal changed by one or more levels at that point, i.e. depending on whether there were any two or more simultaneous inputs of equal magnitude arriving over lines 100. Since two or more equal inputs indicate a signal that is substantially noise free, comparator 104 is set to change states and provide an output whenever any of the spikes from the differentiator exceeds a value set just below the value corresponding to the sum of two spike amplitudes.

The differentiator output is shaped in the one shot circuit 106 to produce standard TTL logic pulses which are shown in curve 5. These pulses are applied to reset ramp generator 116 after a brief delay. The result is shown in curve 6 where the output of ramp generator 116 is shown first rising rapidly following resetting from the pulse generator 58, then being reset at by the leading edge of each of the TTL pulses from the one shot multivibrator 106. The amplitude reached is an indication of the difference in the amplitude of two signals. The smallest the amplitude the smallest the difference.

The output of ramp generator 116 is sampled and held by sample and hold module 114. Comparator 117 constantly compares the current output of ramp generator 116 over line 111 to the held output on line 113. Comparator 117 outputs either a "0" if the ramp value is greater than the held value or a "1" value if the current ramp output is lower than the held value. A "1" value results in gate 118 outputing a "1" value which through gate 122 controls sample and hold module 124. This module then samples and holds the current level of the ramp voltage generated by the ramp generator 60 which corresponds to the amplitudes of the input signals.

Gate 122 is also connected to the output of comparator 104 which outputs a "1" if the spike level at its input equals two or more spike amplitudes as previously described. Thus the sample and hold module 124 is triggered if there are two or more input signals having the same amplitude.

When two equal magnitude signals are detected, the search for the lowest noise signal is by definition over. Thus the output from comparator 104 is applied to gate 130 triggering one shot multivibrator 128 which is used to enable sample and hold circuit 126. The sample and hold circuit 126 when enabled senses the voltage on line 125 and outputs it as an analog out signal to whatever peripheral device the system is connected to, typically an amplifier and a speaker system.

Gate 130 is also triggered by the output of pulse generator 58' at the end of each cycle whether it has been triggered by comparator 104 or not. Thus at the end of each cycle the sample and hold circuit will sample the signal on line 125 and output it to the peripheral device whether there are two equal magnitude signals detected or whether there are two signals with minimum difference in their amplitudes, in which case the largest amplitude of the two is outputed.

The output of the comparator 104 is applied with a very short delay created by delay circuit 108 to gate 112. The purpose of this delay is to artificially produce two trigger signals in sample and hold module 114, one from the one shot 106, the second from the comparator 104 which follow each other very closely in time and result in comparator 117 detecting a "minimum" magnitude difference and not triggering again gates 118 or sample and hold circuit 124 after two equal amplitudes have been detected.

The invention has been described hereinabove with particular examples primarily directed to the reception of audio FM signals. However this is not a limitation, and the particular carrier frequency or modulation method for the information is not critical to this invention. Thus the signals may be received over three or more fiber optic channels and carry information in any convenient format. After signal detection and demodulation, the process of this invention is equally applicable. Further more while not generally used, the information may be transmitted over three or more transmitting stations and received over three or more different frequencies.

Thus in general, this method can be used to minimize noise from any analog signal which can be received by three or more receivers not subjected to the same noise simultaneously. High quality analog signal can be sent and received if three or more independent channels are used and those having the benefit of this disclosure may well devise other specific methods relying on the disclosures herein for achieving the same result which methods are within the scope of this, my invention, in which I claim:

1. Apparatus for receiving an analog information carrying signal having an amplitude, the information carrying signal having information and noise components, the information component also having frequencies associated with it, the apparatus comprising:
   (1) three discrete signal receiving channels for receiving the information carrying signal;
   (2) logic means connected to said signal receiving channels for comparing the amplitude of the information carrying signal received by each of the receiving channels and for:
      (a) when two or more of said signals received by said channels have substantially equal amplitudes, outputing any one of said two or more signals;
      (b) when no two or more signals received by said channels have substantially the same amplitude, outputing one of said signals received by one of said channels, whose amplitude is intermediate of the other two signals received by each of the other two channels.

2. A method for receiving an analog information carrying signal having an amplitude, the information carrying signal having information and noise components, the information component also having frequencies associated with it, the method comprising the steps of:
  (1) receiving the analog information carrying signal, over "n" discrete channels, wherein "n" is an integer greater than 3, and producing n received signals each having an amplitude;
  (2) comparing the amplitude of the n received signals;
  (3) determining if there are any received signals having the same amplitude and if not, determining which two of the n received signals amplitudes have the least difference;
  (4) outputting any one of any received signals having the same amplitudes, and if no received signals have the same amplitude, outputting the received signal having an amplitude equal to a preselected one of the two received signals having the least difference in amplitudes;
  (5) repeating steps (2) through (4) at a frequency exceeding the highest frequency in the information signal.

3. A method for receiving an analog information carrying signal having an amplitude, the information carrying signal having information and noise components, the information component also having frequencies associated with it, the method comprising the steps of:
  (1) receiving the analog information carrying signal, over 3 discrete channels, and producing 3 received signals each having an amplitude;
  (2) comparing the amplitudes of the 3 received signals;
  (3) determining if there are any received signals having the same amplitude and if not, determining which of the received signals has an amplitude which is intermediate to the other amplitudes
  (4) outputting any one of any received signals having the same amplitudes, and if no received signals have the same amplitude, outputting the received signal having the intermediate amplitude
  (5) repeating steps (2) through (4) at a frequency exceeding the highest frequency in the information signal.

4. Apparatus for receiving an analog information carrying signal having an amplitude, the information carrying signal having information and noise components, the information component also having frequencies associated with it, the apparatus comprising:
  (1) "n" discrete signal receiving channels, wherein "n" is an integer greater than 3;
  (2) logic means connected to each of said "n" discreet signal receiving channels for comparing the amplitude of the information carrying signal received by each of the "n" receiving channels and for,
    (a) determining if there are any received signals having the same amplitude and if not, determining which two of the n received signals amplitudes have the least difference; and
    (b) outputting any one of any received signals having the same amplitudes, and if no received signals have the same amplitude, outputting the received signal having an amplitude equal to a preselected one of the two received signals having the least difference in amplitudes.

5. The apparatus in accordance with claim 1 further comprising sampling means for simultaneously sampling said three received information carrying signals to produce three simultaneous sampled information carrying signals each of said sampled signals having an amplitude, and receiving means for receiving the information carrying signals, the sampling means connected between the receiving means and the logic means.

6. The method in accordance with claim 2 wherein the preselected received signal is the signal whose amplitude is the higher of the two received signals having the least difference in their amplitudes.

7. The method in accordance with claim 2 comprising an additional sampling step performed after the receiving step and prior to the comparing step, the sampling step comprising sampling each of said received signals, to provide "n" sampled signals which are then used for comparing, determining, and outputting, in the comparing, determining and outputting steps, and wherein the repeating step includes the sampling step.

8. The method in accordance with claim 3 comprising an additional sampling step performed after the receiving step and prior to the comparing step, the sampling step comprising sampling each of said 3 received signals, to provide 3 sampled signals which are then used for comparing, determining, and outputting in the comparing, determining and outputting steps, and wherein the repeating step includes the sampling step.

9. The apparatus in accordance with claim 4 wherein the preselected amplitude is the higher of the amplitudes of the two received signals having the least difference in amplitudes.

10. The apparatus in accordance with claim 9 wherein the logic means includes "n" comparators connected in parallel for comparing said "n" received signals to a ramp voltage and wherein the comparators have outputs and said outputs are connected to an adder.

11. The apparatus in accordance with claim 4 further comprising sampling means connected between said channels and said logic means for simultaneously sampling said received signal in said "n" channels to generate "n" sampled signals.

12. The method in accordance with any of claims 2, 6, 7, 3, or 8, wherein each of said channels comprises an antenna and each antenna is spaced from any other antenna, to generate discrete received signals.

13. The method in accordance with any one of claims 2, 6, 7, 3 or 8, wherein the information carrying signal is received over distinct paths.

14. The method in accordance with claims 2 or 3 wherein the information carrying signal is a Frequency Modulated (FM) electromagnetic wave.

15. The apparatus in accordance with any one of claims 4, 9, 11, 1, or 5, wherein the receiving channels each comprise an antenna and the antennas are spaced apart from each other.

16. The apparatus in accordance with any one of claims 4, 9, 10, or 1, wherein the information carrying signal is an FM modulated electromagnetic wave.

* * * * *